(12) United States Patent
Gupta et al.

(10) Patent No.: US 12,511,153 B2
(45) Date of Patent: Dec. 30, 2025

(54) ARBITRATED INTERRUPT STEERING IN HETEROGENEOUS PROCESSORS

(71) Applicant: Advanced Micro Devices, Inc., Santa Clara, CA (US)

(72) Inventors: Pravesh Gupta, Bangalore (IN); Benjamin Tsien, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 101 days.

(21) Appl. No.: 18/478,426

(22) Filed: Sep. 29, 2023

(65) Prior Publication Data

US 2025/0110773 A1 Apr. 3, 2025

(51) Int. Cl.
G06F 9/48 (2006.01)
G06F 1/3293 (2019.01)
G06F 1/3296 (2019.01)

(52) U.S. Cl.
CPC .......... *G06F 9/4831* (2013.01); *G06F 1/3293* (2013.01); *G06F 1/3296* (2013.01); *G06F 9/48* (2013.01); *G06F 9/4893* (2013.01)

(58) Field of Classification Search
None
See application file for complete search history.

(56) References Cited

U.S. PATENT DOCUMENTS

| 11,886,224 | B2 * | 1/2024 | De Paula Rosa Piga ................... G06F 9/5094 |
| 2004/0215987 | A1 * | 10/2004 | Farkas ................... G06F 9/5088 713/300 |
| 2016/0147532 | A1 | 5/2016 | Min et al. |
| 2016/0196141 | A1 | 7/2016 | Deshpande et al. |
| 2016/0291672 | A1 * | 10/2016 | Sharda ................... G06F 9/5094 |
| 2017/0212851 | A1 | 7/2017 | Jayasena et al. |
| 2018/0232321 | A1 * | 8/2018 | Akyildiz ............... G06F 9/4812 |
| 2020/0301860 | A1 * | 9/2020 | Hsu ........................ G06F 1/3293 |

OTHER PUBLICATIONS

International Search Report and Written Opinion from the International Searching Authority from corresponding PCT Application No. PCT/US2024/033895, dated Sep. 27, 2024, (7 pages), by: Authorized Office: Jae Yong Ko.

* cited by examiner

*Primary Examiner* — Michael Sun
(74) *Attorney, Agent, or Firm* — Greenberg Traurig, LLP

(57) ABSTRACT

The disclosed device includes a heterogeneous processor architecture having heterogeneous processors, and a control circuit that can assign, in response to an interrupt, the interrupt to one of the heterogenous processors that is selected based on power efficiency. Various other methods, systems, and computer-readable media are also disclosed.

20 Claims, 3 Drawing Sheets

ARBITRATED INTERRUPT STEERING IN HETEROGENEOUS PROCESSORS

BACKGROUND

Interrupts are often used in computing systems to request a processor to interrupt its current execution, when it is able to do so, and handle the interrupt. Interrupts can be asynchronously issued in response to events, such as an input from a peripheral (e.g., a user input). In a homogeneous processor architecture (e.g., a processor having multiple iterations of a same processing core), interrupts can often be assigned to a core based on availability and/or priority (e.g., a priority of the interrupt, a priority of workload performed by a core, etc.) because latency and other power/performance considerations can be the same for the cores. However, in a heterogeneous processor architecture (e.g., a processor having different types of cores, such as cores of different performance and/or power efficiencies) assigning interrupts similar to the homogeneous processor architecture can materially affect power/performance.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
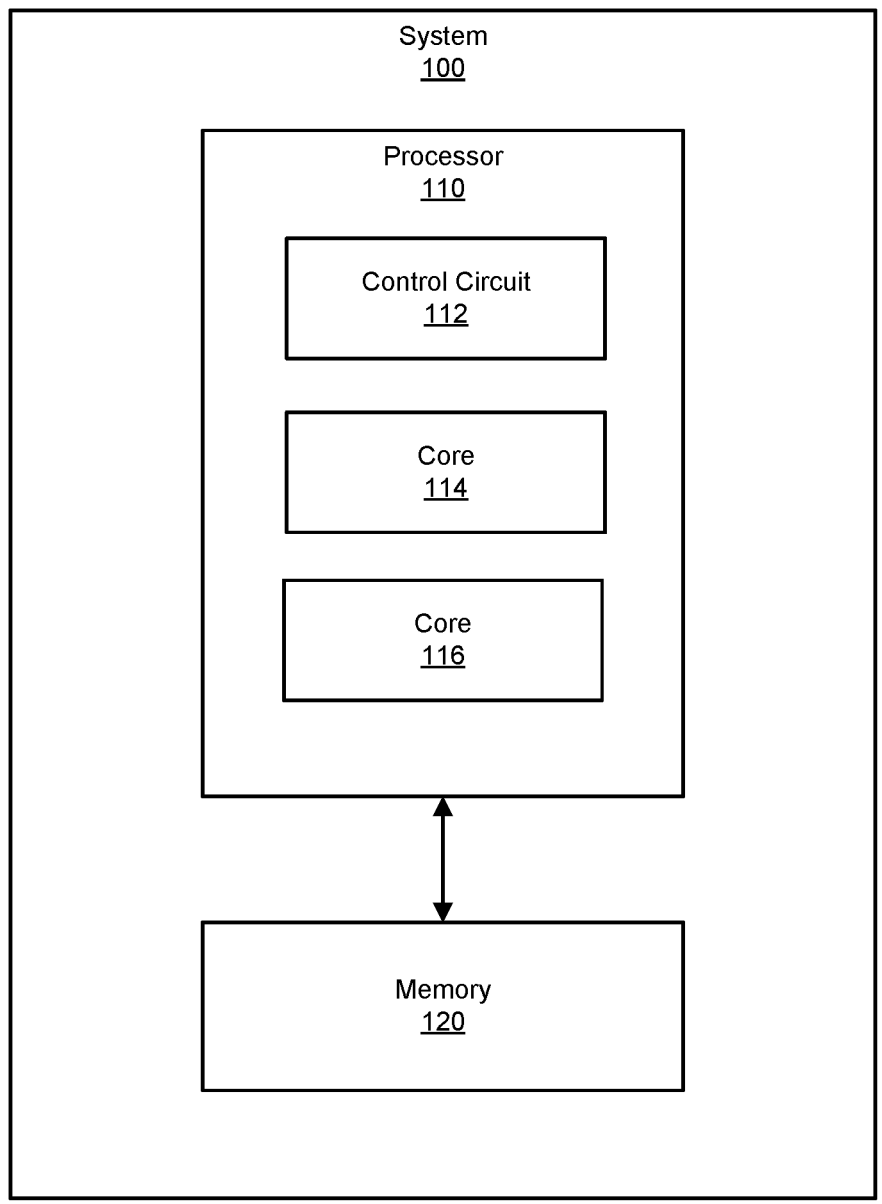
FIG. 1 is a block diagram of an exemplary system for arbitrated interrupt steering in heterogeneous processors.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to arbitrated interrupt steering in heterogeneous processors. As will be explained in greater detail below, implementations of the present disclosure arbitrate interrupt steering by selecting one of the heterogeneous processors based on power efficiency in response to an interrupt, and assigning the interrupt to the selected processor. This arbitration advantageously allows selecting a high efficiency processor over a high-performance processor to realize power savings, but can be flexible to select the high-performance processor as needed (e.g., to prioritize performance).

In one implementation, a device for arbitrated interrupt steering in heterogeneous processors includes a plurality of heterogeneous processors, and a control circuit configured to assign, in response to an interrupt, the interrupt to a processor of the plurality of heterogenous processors that is selected based on power efficiency.

In some examples, the control circuit is configured to select an efficiency processor as the processor for assigning the interrupt when the plurality of heterogeneous processors are each in a low power state. In some examples, the control circuit is configured to select an efficiency processor as the processor for assigning the interrupt when the plurality of heterogeneous processors each have a same low priority. In some examples, the control circuit is configured to select a high-performance processor that is not in a low power state as the processor for assigning the interrupt when the plurality of heterogeneous processors are each in a same low priority and efficiency processors of the plurality of heterogeneous processors are each in the low power state.

In some examples, the control circuit is configured to select a high-performance processor as the processor for assigning the interrupt in response to an override configuration to prioritize performance over power efficiency. In some examples, the override configuration is based on a current workload profile. In some examples, the selected high-performance processor is in a low power state. In some examples, the interrupt corresponds to a low priority interrupt.

In one implementation, a system for arbitrated interrupt steering in heterogeneous processors includes a plurality of heterogenous processors comprising a plurality of efficiency processors and a plurality of high-performance processors, and a control circuit configured to assign, in response to an interrupt, the interrupt to a processor of the plurality of heterogenous processors that is selected based on power efficiency, wherein each of the plurality of heterogeneous processors each have a same low priority at a time of the interrupt.

In some examples, the control circuit is configured to select one of the plurality of efficiency processors for assigning the interrupt when the plurality of heterogeneous processors are each in a low power state. In some examples, the control circuit is configured to select one of the plurality of high-performance processors that is not in a low power state.

In some examples, the control circuit is configured to select one of the plurality of high-performance processors in response to an override configuration to prioritize performance over power efficiency. In some examples, the override configuration is based on a current workload profile. In some examples, the selected high-performance processor is in a low power state. In some examples, the interrupt corresponds to a low priority interrupt.

In one implementation, a method for arbitrated interrupt steering in heterogeneous processors includes (i) receiving an interrupt while each of a plurality of heterogeneous processors have a same low priority, (ii) selecting, based on prioritizing power efficiency, a processor from the plurality of heterogeneous processors to address the interrupt, and (iii) assigning the interrupt to the selected processor.

In some examples, the method includes selecting an efficiency processor when the plurality of heterogeneous processors are each in a low power state. In some examples, the method includes selecting a high-performance processor that is not in a low power state.

In some examples, the method includes selecting a high-performance processor in response to an override configuration to prioritize performance over power efficiency. In some examples, the override configuration is based on a current workload profile.

Features from any of the implementations described herein can be used in combination with one another in accordance with the general principles described herein.

These and other implementations, features, and advantages will be more fully understood upon reading the following detailed description in conjunction with the accompanying drawings and claims.

Figure 2:
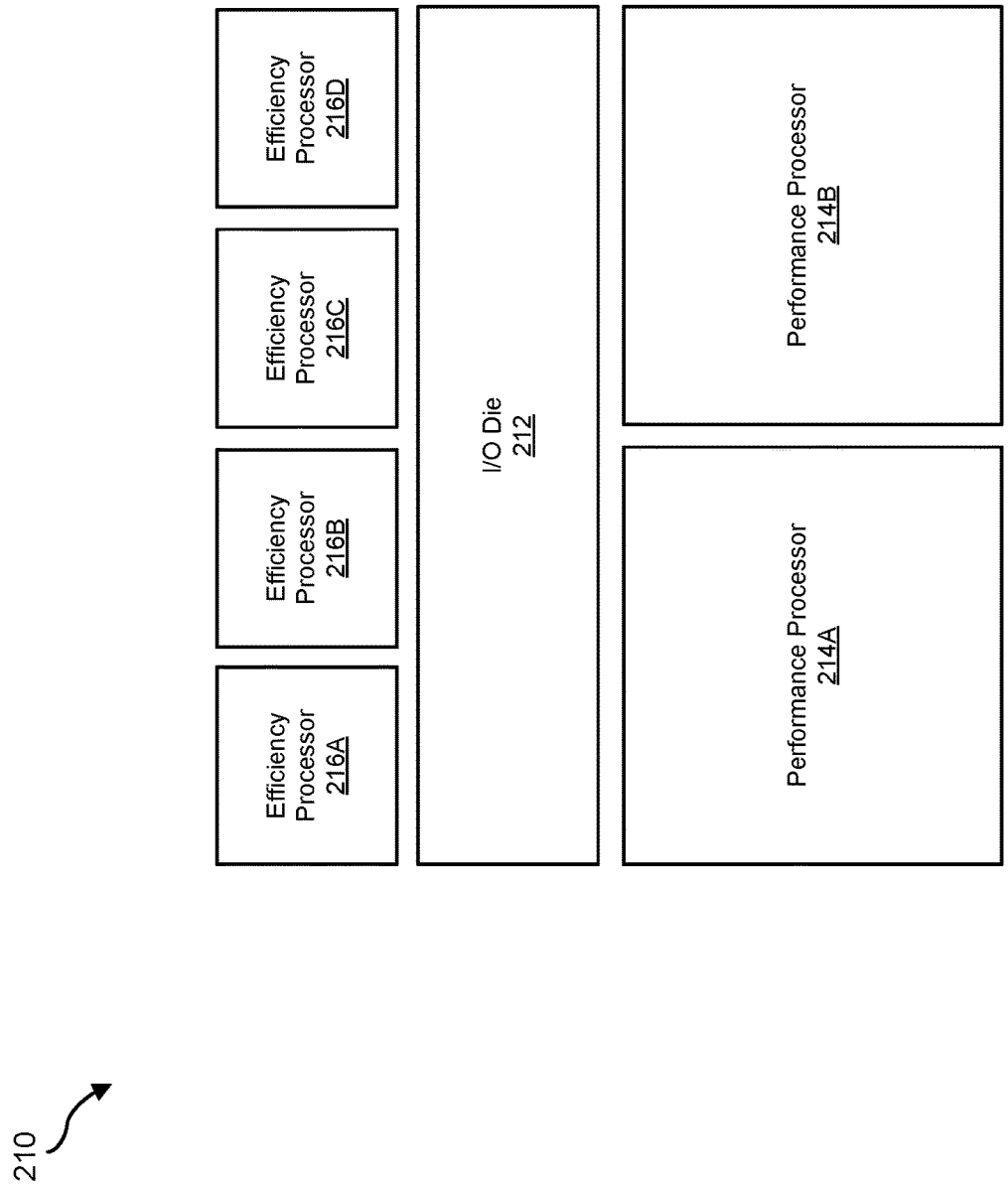
FIG. 2 is a block diagram of an exemplary heterogeneous processor architecture for arbitrated interrupt steering.
Figure 3:
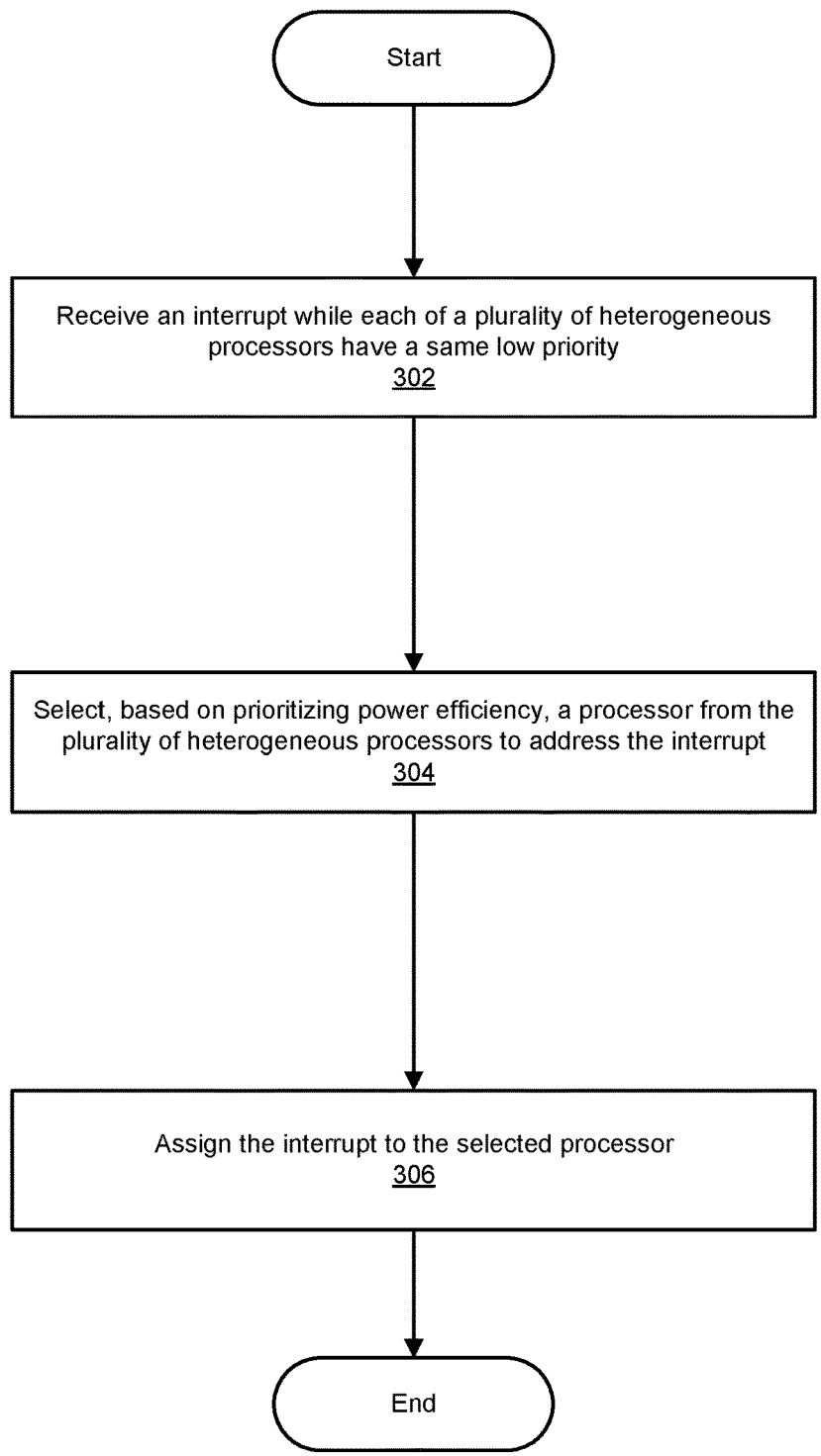
FIG. 3 is a flow diagram of an exemplary method for arbitrated interrupt steering in heterogeneous processors.

The following will provide, with reference to FIGS. 1-3, detailed descriptions of arbitrated interrupt steering in heterogeneous processors. Detailed descriptions of example systems and architectures will be provided in connection with FIGS. 1 and 2. Detailed descriptions of corresponding methods will also be provided in connection with FIG. 3.

FIG. 1 is a block diagram of an example system 100 for arbitrated interrupt steering in heterogeneous processors. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a control circuit 112, a core 114, and a core 116. Control circuit 112 corresponds to circuitry and/or instructions for arbitrating interrupts, such as an interrupt handler, and in some examples can be integrated with other controllers. Core 114 and core 116 each correspond to processing components of processor 110. In some examples, processor 110 corresponds to a heterogeneous processor architecture such that core 114 can correspond to a first type of processor (e.g., a high-performance processor or core which can have a high compute power often with high power consumption) and core 116 can correspond to a different second type of processor (e.g., an efficiency processor or core which can have efficient power consumption often with reduced compute power). In other words, a high-performance processor or core can have higher computing performance and higher power consumption compared to an efficiency processor or core, whereas an efficiency processor or core can have reduced power consumption and reduced computing performance compared to a high-performance processor or core. In some implementations, a high-performance processor/core can be larger than an efficiency processor/core, such as by having more transistors and/or having a larger cache than an efficiency processor/core. In some implementations, a high-performance processor/core can be configured to operate at higher voltages and/or frequencies than that of an efficiency core. In addition, in some examples, processor 110 can include additional iterations of core 114 and/or core 116.

Control circuit 112, which can correspond to an interrupt handler, can arbitrate interrupts by selecting an appropriate core for handling the interrupt. Although certain types or classes of interrupts can be associated with a particular interrupt handler and/or circuit, other classes of interrupts can be handled by any available processing component, such as low priority interrupts that can be serviced by a core doing least important work (e.g., a core at a lowest priority). In some implementations, interrupts can be categorized into different priorities such that a higher priority interrupt can preempt a lower priority interrupt (e.g., the interrupt handler can manage an interrupt priority to address/complete higher priority interrupts before lower priority interrupts that can wait on the higher priority interrupts). Interrupt priorities can be based on, in some examples, hardware interrupts (e.g., interrupts relating to hardware conditions/events, signals from components such as input/output, controllers, logic units, memory, timers, etc.), software interrupts (e.g., system calls, instructions, software events, etc. that can be set by software and/or operation system). In some examples, low priority interrupts correspond to interrupts that can be postponed, such as servicing a low priority device, and high priority interrupts can correspond to interrupts that cannot be postponed arbitrarily, such as servicing a high priority device or software.

In some examples, control circuit 112 can select the core previously selected for handling a similar interrupt (e.g., selecting the core assigned to an interrupt vector of which a current interrupt is a new entry for the interrupt vector). However, multiple cores are often the same low priority (e.g., lowest priority) such that control circuit 112 can select a core based on arbitration as described herein (which in some examples can further default to another scheme such as round-robin).

FIG. 2 illustrates a processor 210, corresponding to processor 110, that further has a heterogeneous processor/core architecture. FIG. 2 includes an efficiency processor 216A, an efficiency processor 216B, an efficiency processor 216C, and an efficiency processor 216D, each corresponding to iterations of core 116 (e.g., high efficiency cores). FIG. 2 also includes a performance processor 214A and a performance processor 214B, each corresponding to iterations of core 114 (e.g., high-performance cores). FIG. 2 further includes an input/output (I/O) die 212 that corresponds to a die for coordinating I/O for the various cores (e.g., efficiency processors 216A-216D and performance processors 214A-214B) and in some examples can include and/or interface with a control circuit (e.g., control circuit 112) for arbitrating interrupts.

As described herein, the control circuit can arbitrate a newly received interrupt by selecting one of the cores and assigning the interrupt to the selected core for handling. Arbitration can be needed, for example, if other factors as described herein produce multiple potential choices, such as if multiple cores are at the same low priority (e.g., lowest priority) and further to power or performance as desired.

In such scenarios when the cores are at the same low priority state at a time of the interrupt, which in some examples can further correspond to the cores being at the same low power state, the control circuit can select a higher efficiency processor (e.g., an available one of efficiency processors 216A-216D) based on power efficiency, to prioritize power savings/efficiency. Prioritizing power savings/efficiency can therefore favor selection one of the high efficiency processors.

However, in some examples, even with prioritizing power savings, the control circuit can one of the high-performance processors (e.g., performance processor 214A or performance processor 214B). For instance, if performance processor 214A is not in a low power state and the remaining cores are in low power states, or at least the high efficiency processors are in the low power state, the control circuit can select performance processor 214A. In such examples, selecting performance processor 214A can provide high-performance without incurring latency for exiting the low power state. In other words, potential power savings benefit of using a high efficiency processor that first must be powered back on can be reduced by the benefit of high-performance provided by the high-performance processor that is already active.

In some examples, the control circuit can arbitrate based on a configuration (e.g., from a configurable parameter). For example, an override configuration can override the configuration such that performance is prioritized over power efficiency. The control circuit can accordingly select one of the high-performance processors over the high efficiency processors even if the control circuit would normally select a high efficiency processor as described above. For instance, the control circuit can select performance processor 214B in accordance with the override configuration even if performance processor 214B is in the low power state. In some examples, the override configuration can correspond to a current workload profile, such as based on a type of instructions/tasks being performed, a number of instructions/tasks being performed, resources (e.g., processors, clock cycles, memory, etc.) being used for the workload, and/or other measurable metrics. In some implementations, a workload profile can be established and/or indicated by an operating system or other software associated with the corresponding workload. The control circuit or other workload monitor can recognize a particular workload (e.g., current workload profile) as requiring performance over power efficiency and accordingly apply the override configuration. In other examples, other conditions and/or events can trigger the override configuration, such as availability of cores, power profile, etc.

FIG. 3 is a flow diagram of an exemplary method 300 for arbitrated interrupt steering in heterogeneous processors. The steps shown in FIG. 3 can be performed by any suitable circuit and/or system, including the system(s) illustrated in FIGS. 1 and/or 2. In one example, each of the steps shown in FIG. 3 represent an algorithm whose structure includes and/or is represented by multiple sub-steps, examples of which will be provided in greater detail below.

As illustrated in FIG. 3, at step 302 one or more of the systems described herein receive an interrupt while each of a plurality of heterogeneous processors have a same low priority. For example, control circuit 112 can receive an interrupt while core 114 and core 116 both have a same low priority (e.g., performing low priority tasks or are idle at the lowest priority).

At step 304 one or more of the systems described herein select, based on prioritizing power efficiency, a processor from the plurality of heterogeneous processors to address the interrupt. For example, control circuit 112 can select core 116, based on prioritizing power efficiency, to address the interrupt.

The systems described herein can perform step 304 in a variety of ways. In one example, control circuit 112 can select a high efficiency processor (e.g., core 116) when the plurality of heterogeneous processors are each in a low power state. In other examples, control circuit 112 can select a high-performance processor (e.g., core 114) when the high-performance processor is not in a low power state.

In some examples, control circuit 112 can select a high-performance processor in response to an override configuration to prioritize performance over power efficiency. In some examples, the override configuration can be based on a current workload profile, such as a workload profile requiring high-performance.

At step 306 one or more of the systems described herein assigning the interrupt to the selected processor. For example, control circuit 112 can assign the interrupt to the selected processor (e.g., core 114 or core 116 as described herein).

As detailed above, lowest priority interrupts (LPA) are a type of CPU interrupt which is expected to be serviced by a CPU core doing the least important work (e.g., having the lowest priority). When selecting cores for servicing LPA interrupts, task/interrupt priority of cores is often a biggest factor.

Heterogeneous core systems can include high-performance cores (e.g., having higher compute power along with higher power consumption) and high-efficiency cores (having less compute power but lower power consumption) such that selecting a core based on priority can lead to inefficient decisions. For example, different classes of cores (e.g., high-performance and high-efficiency cores) can be at the lowest priority such that any class can be chosen, potentially leading to undesirable choice, such as selecting a high-performance core when efficiency is desired or selecting a high-efficiency core when performance is desired. In addition, an exit latency for a core exiting a low power state is often not considered when choosing a core. The systems and methods described herein allow arbitration for selecting between high-performance and high-efficiency cores, for example prioritizing efficiency (e.g., selecting high-efficiency cores) or performance (e.g., selecting high-performance cores) to service interrupts.

In some implementations, for selecting a core for an interrupt, if after the initial selection factors (e.g., a lowest priority or power state core, or a core that previously handled the same interrupt vector) do not produce a selection (e.g., multiple cores are in the lowest priority), additional factors can be used: (a) if all cores are in low power, select a high-efficiency core (which allows for power saving), (b) if there is at least one high-performance core not in low power, select one of those high-performance cores (producing higher performance without a low power exit penalty), and (c) alternatively, if no selection is produced, a core can be selected based on a round-robin scheme.

Additionally, a configurable override can favor selecting high-performance cores when available (e.g., even when in low power) to allow better performance (e.g., faster execution) and can be based on a workload profile. The override can advantageously provide flexibility in prioritizing performance when needed, for example by favoring high-performance cores rather than high-efficiency cores.

As detailed above, the circuits, devices and systems described and/or illustrated herein broadly represent any type or form of computing device or system capable of executing computer-readable instructions. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
   a plurality of heterogeneous processors; and
   a control circuit configured to assign, in response to an interrupt, the interrupt to a processor of the plurality of heterogenous processors that is selected based on power efficiency and prioritizing processors that are active.

2. The device of claim 1, wherein the control circuit is configured to select an efficiency processor as the processor for assigning the interrupt when the plurality of heterogeneous processors are each in a low power state.

3. The device of claim 1, wherein the control circuit is configured to select an efficiency processor as the processor for assigning the interrupt when the plurality of heterogeneous processors each have a same low priority.

4. The device of claim 1, wherein the control circuit is configured to select a high-performance processor that is not in a low power state as the processor for assigning the interrupt when the plurality of heterogeneous processors are each in a same low priority and efficiency processors of the plurality of heterogeneous processors are each in the low power state.

5. The device of claim 1, wherein the control circuit is configured to select a high-performance processor as the processor for assigning the interrupt in response to an override configuration to prioritize performance over power efficiency.

6. The device of claim 5, wherein the override configuration is based on a current workload profile.

7. The device of claim 5, wherein the selected high-performance processor is in a low power state.

8. The device of claim 1, wherein the interrupt corresponds to a low priority interrupt.

9. A system comprising:
   a plurality of heterogenous processors comprising a plurality of efficiency processors and a plurality of high-performance processors; and
   a control circuit configured to assign, in response to an interrupt, the interrupt to a processor of the plurality of heterogenous processors that is selected based on power efficiency and prioritizing processors that are active,
   wherein each of the plurality of heterogeneous processors each have a same low priority at a time of the interrupt.

10. The system of claim 9, wherein the control circuit is configured to select one of the plurality of efficiency processors for assigning the interrupt when the plurality of heterogeneous processors are each in a low power state.

11. The system of claim 9, wherein the control circuit is configured to select one of the plurality of high-performance processors that is not in a low power state.

12. The system of claim 9, wherein the control circuit is configured to select one of the plurality of high-performance processors in response to an override configuration to prioritize performance over power efficiency.

13. The system of claim 12, wherein the override configuration is based on a current workload profile.

14. The system of claim 12, wherein the selected high-performance processor is in a low power state.

15. The system of claim 9, wherein the interrupt corresponds to a low priority interrupt.

16. A method comprising:
    receiving an interrupt while each of a plurality of heterogeneous processors have a same low priority;
    selecting, based on prioritizing power efficiency and prioritizing processors that are active, a processor from the plurality of heterogeneous processors to address the interrupt; and
    assigning the interrupt to the selected processor.

17. The method of claim 16, further comprising selecting an efficiency processor when the plurality of heterogeneous processors are each in a low power state.

18. The method of claim 16, further comprising selecting a high-performance processor that is not in a low power state.

19. The method of claim 16, further comprising selecting a high-performance processor in response to an override configuration to prioritize performance over power efficiency.

20. The method of claim 19, wherein the override configuration is based on a current workload profile.

* * * * *